United States Patent Office 3,477,487
Patented Nov. 11, 1969

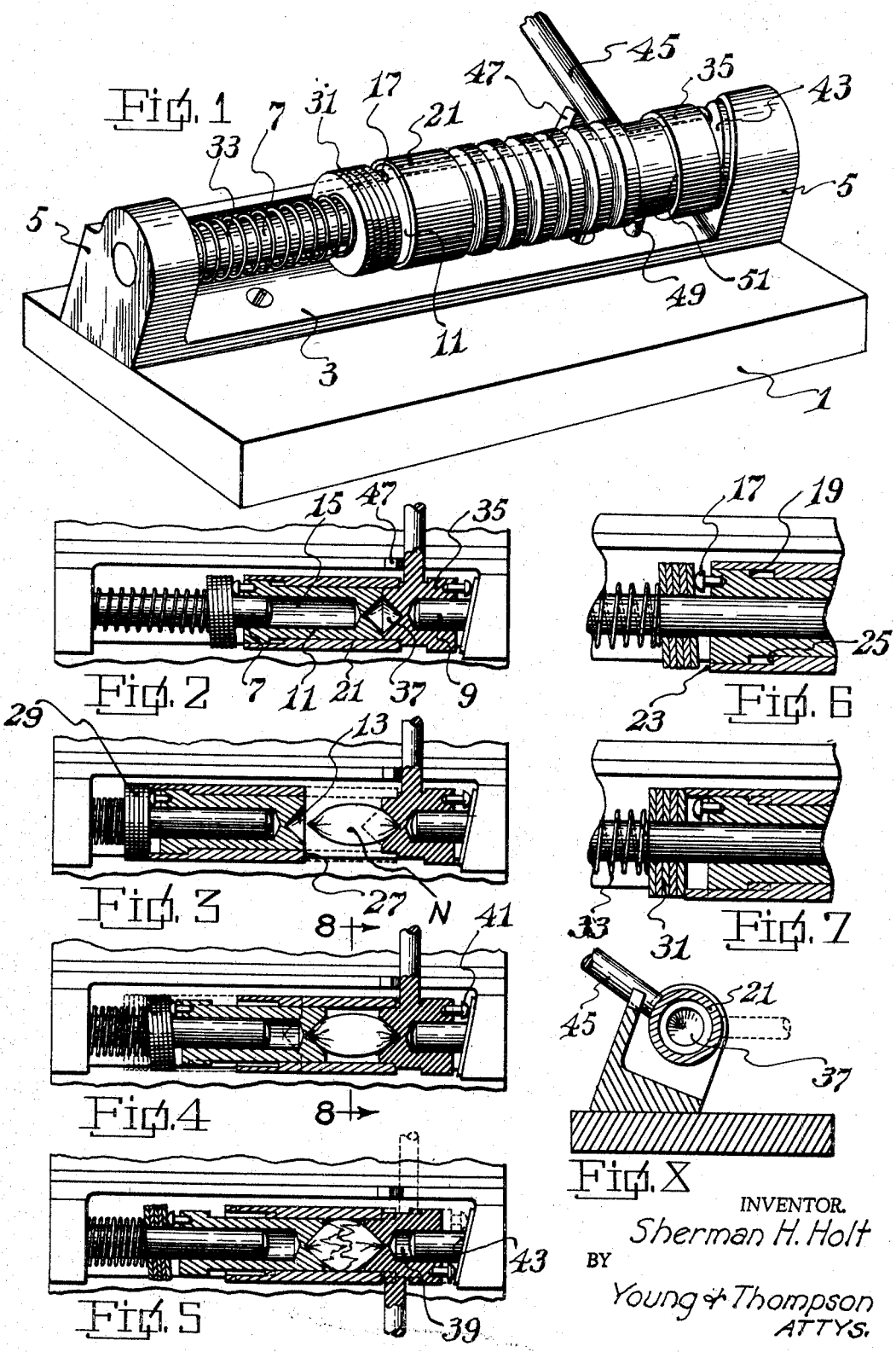

3,477,487
APPARATUS FOR APPLYING PRESSURE
Sherman H. Holt, 847 N. Marion,
Tulsa, Okla. 74115
Filed Oct. 31, 1967, Ser. No. 679,418
Int. Cl. A47j 43/26
U.S. Cl. 146—16                    8 Claims

ABSTRACT OF THE DISCLOSURE

A pair of opposed jaws are movable relatively to each other, transom lock means being associated with one of said jaws for selectively preventing its movement away from said other jaw.

The present invention relates to apparatus for applying pressure, more particularly of the type in which a pair of opposed jaws may be selectively moved toward and away from each other thereby to apply pressure to an object between the jaws. In a preferred form, the present invention is embodied in a nutcracker and will be disclosed in that environment and will be claimed in that environment in the more restricted claims. It is to be expressly understood, however, that in addition to use as a nutcracker the device of the present invention has application in a wide variety of other environments.

Accordingly, it is an object of the present invention to provide apparatus for applying pressure, characterized in that the apparatus can be quickly and easily opened to admit an object between the jaws.

Another object of the present invention is the provision of apparatus for applying pressure, characterized by good mechanical advantage.

Still another object of the present invention is the provision of apparatus for applying pressure, characterized in that the parts are conveniently maintained in alignment with each other.

Still another object of the present invention is the provision of a nutcracker in which the nut will be entirely enclosed during cracking to prevent pieces of shell or nut from flying out of the cracker.

Finally, it is an object of the present invention to provide apparatus for applying pressure, and to provide a nutcracker, that will be relatively simple and inexpensive to manufacture, easy to operate, and rugged and durable in use.

Other objects and advantages of the present invention will become apparent from a consideration of the following description, taken in connection with the accompanying drawing, in which:

FIGURE 1 is a perspective view of a nutcracker according to the present invention;

FIGURE 2 is a fragmentary plan view, with parts in cross section, of the structure of FIGURE 1 in its rest position;

FIGURE 3 is a view similar to FIGURE 2 but showing the parts at the time of the introduction of a nut between the jaws;

FIGURE 4 is a view similar to FIGURES 2 and 3 but showing the device closed on the nut immediately prior to cracking the nut;

FIGURE 5 is a view similar to FIGURES 2–4 but showing the position of the parts immediately after the nut has been cracked;

FIGURE 6 is an enlarged fragment of FIGURE 1 showing the automatic lock of the nutcracker in locked position;

FIGURE 7 is a view similar to FIGURE 6 but showing an enlarged fragment of FIGURE 3 in which the automatic lock is rendered inoperative so that the parts are in position for moving the jaws apart; and FIGURE 8 is a cross-sectional view taken on the line 8—8 of FIGURE 4.

Referring now to the drawing in greater detail, there is shown a nutcracker comprising a base 1 and having a frame 3 fixedly secured to the base. Stanchions 5 are integral with and upstand from each end of frame 3. One stanchion 5 carries a horizontal post 7 while the other stanchion 5 carries a horizontal post 9. Posts 7 and 9 are coaxial and extend from their respective stanchions toward each other but are spaced apart a considerable distance at their ends. Preferably, post 7 is substantially longer than post 9.

A first jaw 11 is mounted for horizontal sliding movement on post 7. Jaw 11 has a recess 13 in its end adjacent post 9, for the reception of a nut or other article to which pressure is to be applied. Jaw 11 also has an internal axial bore 15 of about the same inside diameter as the outside diameter of post 7, in which post 7 is slidably disposed so that jaw 11 slides axially on post 7. Bore 15 opens away from post 9, that is, in the opposite direction from recess 13.

At its rear end, first jaw 11 carries a rearwardly extending projection 17 that is eccentric from the axis of jaw 11 and that extends rearwardly, that is, in a direction away from post 9, farther than any other portion of jaw 11. Intermediate its length, jaw 11 also has a forwardly facing annular shoulder 19, that is, a shoulder 19 that faces toward post 9. A cylindrical sleeve 21 is carried on jaw 11 coaxially thereof and slides axially thereon. Sleeve 21 has a rear edge 23 disposed in a plane perpendicular to the axis of the sleeve and which in the rearmost slid position of sleeve 21 on jaw 11 is spaced a substantial distance to the rear both of jaw 11 and of projection 17. Sleeve 21 also has an internal annular shoulder 25 that faces rearwardly, that is, away from post 9. Shoulder 25 is preferably of the same radial extent as shoulder 19, so that shoulders 19 and 25 can engage with each other when rear edge 23 is disposed to the rear of projection 17. At its other end, sleeve 21 terminates in a forward edge 27.

Means for selectively locking jaw 11 in any of a plurality of horizontally slid positions along post 7 are provided, in the form of a transom lock 29. Lock 29 includes at least one ring or washer 31, and in the preferred embodiment a stack of washers 31 encircle post 7 rearwardly of jaw 11 and are of an internal diameter somewhat greater than the external diameter of post 7 so that washers 31 can rock on post 7 in addition to sliding axially along post 7. A coil compression spring 33 acts between the rearmost washer 31 and the associated stanchion 5 continuously to urge washers 31 forwardly.

Recess 13 of jaw 11 confronts a second jaw 35. Jaw 35 has a recess 37 in its work-engaging face, that opens toward recess 13 of jaw 11. When jaws 11 and 35 are together as shown in FIGURE 2, the recesses 13 and 37 form a closed chamber. In any event, recesses 13 and 37 cooperate to define between them the means for clamping articles such as nuts between jaws 11 and 35. Jaw 35 also has an axial bore 39 by which it is slidably mounted on post 9 for movement axially of post 9, that is, movement coaxially of jaw 11. A projection 41 extends rearwardly from jaw 35 a distance greater than any other portion of jaw 35 and slidably contacts an inclined cam track 43. Cam track 43 is preferably disposed in a plane which intersects the axis of post 9 at an acute angle. A handle 45 extends radially outwardly from the axis of posts 7 and 9 and jaws 11 and 35 and is in unitary assembly with jaw 35 thereby to provide a means for rotating jaw 35 on its axis. A return cam 47 is carried by frame 3 and assures that when handle 45 is in the full line position shown in FIGURES 1 and 8, jaw 35 will be disposed as far as possible to the right as shown in FIGURES 2–5.

Similarly, a stop 49 is carried by frame 3 and is adapted to contact a radial shoulder 51 on jaw 35 thereby to prevent extreme movement of jaw 35 to the left as seen in FIGURES 2–5.

In operation, with the handle in the position shown in FIGURE 1, sleeve 21 is drawn to the left so that the parts move from the position of FIGURE 2 to the position of FIGURE 3. As sleeve 21 moves toward the left, rear edge 23 contacts washers 31 and brings them into coaxial relationship with post 7 so that they can slide freely on post 7. Continued movement of sleeve 21 to the left thus pushes washers 31 to the left as seen in the various figures, against the action of coil compression spring 33.

Shortly after sleeve 21 has contacted rings 31, shoulders 19 and 25 interengage, so that sleeve 21 also draws jaw 11 to the left as seen in the various figures, which causes recesses 13 and 37 to move apart from each other to provide room for an object to which it is desired to apply pressure.

Let it be assumed that the device is in use as a nutcracker. A nut N is then placed between jaws 11 and 35 and sleeve 21 is released so that jaw 11 and with it sleeve 21 are pressed to the right as seen in the figures, until the nut is firmly seated in recesses 13 and 37. Sleeve 21, however, is manually slid further to the right, from the phantom line to the full line position of FIGURE 4, so that forward edge 27 of sleeve 21 slides over the adjacent end portion of jaw 35. In the full line position of FIGURE 4, therefore, sleeve 21 performs two functions: first, it provides a sleeve that maintains jaws 11 and 35 coaxial and prevents them from wobbling on their respective posts, thereby to assure that the parts remain in alignment during the application of pressure; and second, it provides a closure all about nut N, so that when the nut is cracked, pieces of the nutshell will not fly out of the nutcracker.

Handle 45 is then turned from the full line to the phantom line position of FIGURE 8, that is, from the phantom line to the full line position of FIGURE 5. During this operation, projection 41 on jaw 35 rides about cam track 43 and pushes jaw 35 toward the left as seen by comparison of FIGURES 4 and 5, that is, toward jaw 11. But as soon as the pressure of jaw 35 is transmitted through the nut to jaw 11, projection 17 on jaw 11 cants washers 31 so that they bind or lock on post 7 thereby preventing rearward movement of jaw 11. Continued movement of handle 45, therefore, compresses nut N and causes its shell to fracture as seen in FIGURE 5. Thereafter, handle 45 can be returned to its full line position shown in FIGURE 8, where return cam 47 urges it to the right as seen in the various figures, that is, back to the position of FIGURES 2 and 3. Stop 49 and shoulder 51 prevent jaw 35 from leaving post 9 altogether; while the depth of bore 15 relative to the length of post 7 is such that jaw 11 cannot leave post 7 in any event, as will be seen from FIGURE 2.

In connection with the cracking operation, it is important to note that sleeve 21 is of a length greater than the total length of jaw 11 including projection 17. This assures that the fingers of the operator cannot be crushed between jaws 11 and 35, for the transom lock is released when sleeve 21 is forced back to the position of FIGURE 3 as by the presence of the operator's fingers between the jaws.

To release the nut, it is necessary only to slide sleeve 21 again to the left as seen in the figures, whereupon first the nut will be exposed, and second the sleeve 21 will straighten out washers 31 and permit them to slide to the left; and third the shoulders 19 on jaws 11 and 25 on sleeve 21, respectively, will interengage whereupon jaw 11 will be drawn to the left to release the nut from between recesses 13 and 37. The cracked nut can then be picked up with the fingers and the meat separated from the shell either with the fingers alone or by use of a conventional nutpick.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. Apparatus for applying pressure, comprising a first jaw and a second jaw movable toward and away from each other, transom lock means for selectively preventing movement of the first jaw away from the second jaw, a fixed post on which the first jaw is mounted for sliding movement toward and away from the second jaw, said transom lock means comprising at least one ring encompassing the post, means continuously yieldably urging the ring toward the second jaw, and means extending from the first jaw toward the ring eccentrically of the post to cant and lock the ring on the post upon the application of force to the first jaw in a direction away from the second jaw.

2. Apparatus as claimed in claim 1, said means continuously urging the ring comprising a coil compression spring encircling the post.

3. Apparatus as claimed in claim 1, and a sleeve slidable on the first jaw to straighten the ring on the post to permit movement of the first jaw away from the second jaw.

4. Apparatus as claimed in claim 3, the sleeve having a length greater than the length of the first jaw including said eccentric means so that the fingers of an operator cannot be squeezed between the jaws without releasing the transom lock.

5. Apparatus as claimed in claim 3, the sleeve having a rear portion that contacts the ring and pushes the ring away from the first jaw and a portion that upon further movement of the sleeve away from the second jaw moves the first jaw away from the second jaw.

6. A nutcracker comprising apparatus as claimed in claim 3, the sleeve being slidable toward and over a portion of the second jaw thereby to enclose the space between the jaws and to maintain the jaws in alignment with each other.

7. Apparatus for applying pressure, comprising a first jaw and a second jaw movable toward and away from each other, and transom lock means for selectively preventing movement of the first jaw away from the second jaw, at least one of the jaws being movable toward and away from the other jaw, and a sleeve mounted for sliding movement on one of the jaws away from the other jaw and toward and over a portion of said other jaw, thereby to enclose the space between the jaws and to maintain the jaws in alignment with each other.

8. A nutcracker as claimed in claim 7, and means continuously yieldably urging said one jaw toward said other jaw, and means on the sleeve for pushing said one jaw away from said other jaw after the sleeve has slid sufficiently far away from said other jaw to expose the gap between the jaws.

References Cited

UNITED STATES PATENTS

| | | | |
|---|---|---|---|
| 1,097,773 | 5/1914 | Sawin | 146—16 |
| 2,695,642 | 11/1954 | White | 146—16 |
| 2,827,087 | 3/1958 | Connor | 146—16 |
| 3,159,194 | 12/1964 | Anderson | 146—16 |

W. GRAYDON ABERCROMBIE, Primary Examiner